UNITED STATES PATENT OFFICE.

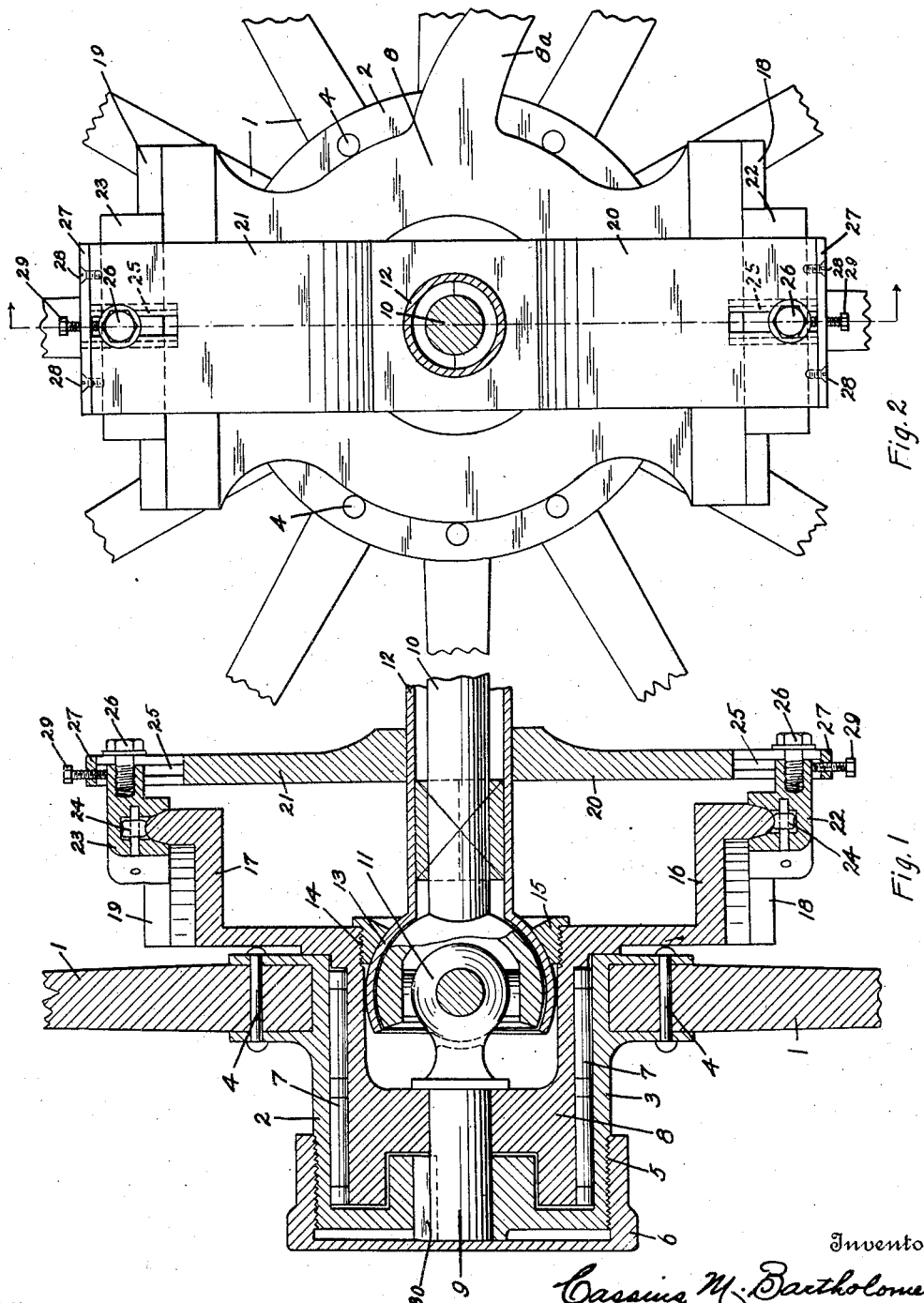

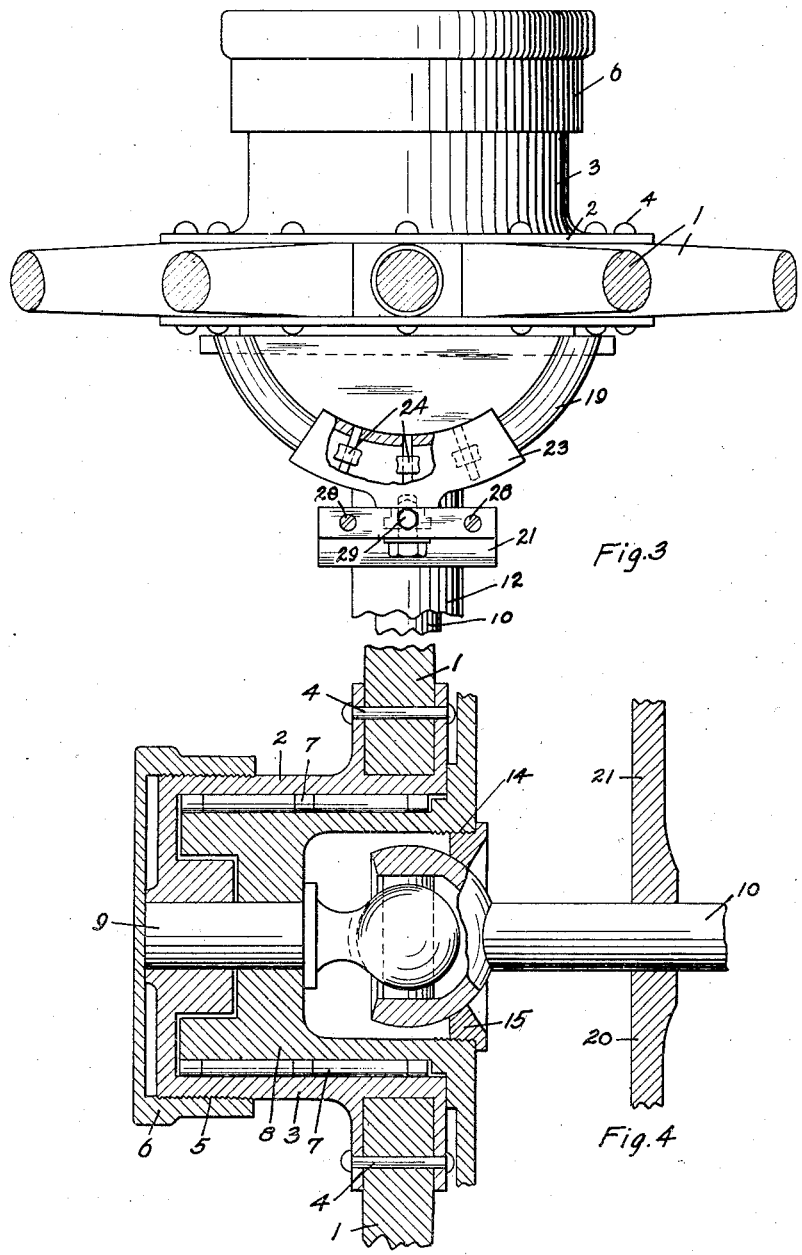

CASSIUS M. BARTHOLOMEW, OF COLUMBUS, OHIO, ASSIGNOR OF ONE-THIRD TO HENRY D. BARTHOLOMEW, OF NEWARK, OHIO.

DRIVING-GEAR.

1,097,965. Specification of Letters Patent. Patented May 26, 1914.

Application filed February 14, 1913. Serial No. 748,306.

*To all whom it may concern:*

Be it known that I, CASSIUS M. BARTHOLOMEW, a citizen of the United States, residing at Columbus, in the county of Franklin and State of Ohio, have invented certain new and useful Improvements in Driving-Gears, of which the following is a specification.

My invention relates to driving gears especially adapted for motor vehicles and aims particularly to provide a type of wheel having its pivot point or point of oscillation disposed entirely within the hub structure and approximately in a plane through the longitudinal center of the rim portion of the wheel.

More specifically, I aim to provide improvements in those types of wheels wherein the shock or side thrust incident to striking an obstruction is eliminated as much as is possible.

One of the salient objects of my invention resides in providing a supplemental trackway to assist in steering the wheel and also usually used as a medium for transmitting the weight of the vehicle body to its supporting wheels. My structure provides the pivoting of the wheel in approximately the center of the hub and a supplemental trackway being in the form of a sector about this pivot point as a center. These sectors form a trackway for supporting arms carried by the main axle structure of the vehicle, which is also preferably provided with anti-friction bearings. This construction also enables me to either drive the wheel from the motor of the vehicle, or to permit the same to run idle on the axle structure.

Another object of my invention is to provide means for adjusting these supporting arms carried by the axle structure upon their corresponding trackways. In this manner, the wear caused by friction existing between the movable parts may be compensated for whenever desired.

A further object of my invention resides in a structure which may be very readily transformed from a driving wheel into an idle wheel without in any way altering the construction of any one of the parts or materially altering their relative construction. The advantages of this will be apparent if it is desired to alternate the positions of the wheels upon the vehicle. This construction also enables me to provide a four wheel drive for any vehicle if a drive of this type should be desired. The all-important feature of this construction is the simplicity of ordering and replacing new parts for old or broken parts, since the constructions used for both the driven and idle wheels are identical.

Other objects of my invention will be apparent from a detailed description of the accompanying drawings, in which similar characters of reference designate corresponding parts, and in which:

Figure 1 is a transverse central section of the center portion of a wheel constructed in accordance with my invention, Fig. 2 is a rear view of the structure shown in Fig. 1, Fig. 3 is a plan view of the same, and, Fig. 4 is a section similar to the construction shown in Fig. 1, but particularly adapted for only an idle wheel construction.

In the drawings, I have shown spokes 1 radiating at regular intervals from the general hub structure 2 and have shown the rim portion of the wheel broken away to more clearly bring out the essential features of my invention. The main structure of the hub portion 2 comprises a hollow cylindrical member 3 apertured for the reception of rivets or pins 4 to securely hold the spokes in place and being threaded as at 5 for the reception of a cap 6 calculated to prevent the admission of dust or grit to the internal hub structure. The inner surface of the cylindrical member 3 is finished to form raceways for anti-friction bearings 7, the complemental raceways being the finished outer surface of a complemental cylindrical member 8 adapted to be carried by the inner portion of the member 3 and fitted with a steering arm 8ª. The cylindrical members 3 and 8 are each centrally apertured for the reception of a driving stub shaft 9 pivotally joined to the main driving shaft 10 through the medium of a universal joint 11 disposed in a plane passing through approximately the longitudinal center of the spoke and rim portion. In order to make the axle 10 of the commonly known floating type, I provide a supplemental casing 12 for enveloping the same and having an enlarged spherical end 13 projecting into the center of the hub structure. The open end of the internal cylinder 8 is internally threaded as at 14 into which is screwed a dust cap 15 adapted to slidably bear against the spherical portion 13 of the enveloping casing 12 and in this manner prevent free pivotal movement of the wheel about the universal connection 11 and at the same time preclude the entrance of dust or grit.

From the description thus far given, it will be apparent that, by means of the universal connection 11, the wheel is permitted free pivotal movement in all directions, which is essential when used as a driver, power being transmitted by means of the shaft 10. However, in order to maintain the wheel proper in a true vertical plane and to also transmit the weight of the vehicle body to the rim portion, I integrally form upon the internal cylinder 8, upwardly and downwardly projecting arms 16 and 17 adapted to be in vertical alinement and carrying sectoral trackways 18 and 19, the center of these sectors being in a vertical line passing through the center of the universal connection 11. Mounted upon the casing 12, are complemental arms 20 and 21 also provided with complemental sectoral bearing members 22 and 23, each fitted with a plurality of steel rollers 24. By this construction, the weight will be transmitted to the wheel proper and the same will also be maintained in a true vertical position, the anti-friction bearings 24 reducing the power required to oscillate the wheels, to a minimum and also preventing an uneven wear upon the trackways 18 and 19. However, wear is inevitable and in order to compensate for this I have provided means for adjusting the bearing portions 22 and 23. These means take the form of the separate bearing bodies 22 and 23 being formed with flanged rear portions adapted to slide vertically in the rabbeted grooves 25 of the arms 20 and 21. The rear portions of the bearing bodies 22 and 23 are drilled and tapped for the reception of holding bolts 26, which prevent their vertical movement in the grooved portions 25. The arms 20 and 21 are capped by strips 27 held in position by screws 28 and are drilled and tapped for supplemental adjusting bolts 29 by means of which a very minute adjustment of the bearing bodies 22 and 23 may be had and in this manner any looseness caused by wear, may be compensated for.

The operation of my device when used as a driving wheel, will be further apparent by the insertion of a key 30 into a suitable keyway formed in the hollow cylindrical member 3 and the stub shaft 9. The rotation of the driving shaft 10 will be transmitted to the stub shaft 9 through the universal joint 11 and by means of the key 30 to the spokes and rim portions through the member 3. The entire rim portion including the hollow cylindrical member 3 will rotate about the internal cylinder 8 owing to the interposition of the anti-friction rollers 7. However, should it be desired to have only an idle wheel and to at all times keep the shaft 10 stationary, all that is necessary is to remove the key 30 from its position shown in Fig. 1, from which it will be apparent that the rim portion will rotate in the same manner by means of the rollers 7, but the member 3 will also rotate about the stub shaft 9. It will thus be seen that I have provided comparatively simple means for transforming a driving wheel into an idle wheel and have also provided means for permitting the pivoting of the wheels about a pivot through their true centers. The advantages of this construction will be apparent.

In Fig. 4, I have shown a type of wheel embodying the principal structural features of the wheel shown in the remaining figures, but instead of using the universal connection 11, I employ a pivotal connection permitting movement in only one direction, from which it will be apparent that the wheel must at all times run idle. This type of wheel has been described in connection with the removal of the key 30 from its position shown in Fig. 1.

What I claim, is:

1. A vehicle wheel comprising a hollow cylindrical member forming a portion of the hub structure, a complemental cylindrical member within said first member and about which said first member is rotatable, upwardly and downwardly projecting arms carried by said complemental member and extending outwardly beyond the outer periphery of said first cylindrical member, sectoral trackways having their centers in a plane passing longitudinally through the center of the wheel carried by said arms, and coöperating arms carried by the axle of the vehicle slidably engaging said trackways.

2. A vehicle wheel comprising a hollow cylindrical member forming a portion of the hub structure, a complemental cylindrical member within said first member and about which said first member is rotatable, upwardly and downwardly projecting arms carried by said complemental member and extending outwardly beyond the outer periphery of said first cylindrical member, sectoral trackways having their centers in a plane passing longitudinally through the center of the wheel, carried by said arms, coöperating arms carried by the axle of the vehicle slidably engaging said trackways, and means for effecting a vertical adjustment between said trackways and said coöperating arms.

3. A vehicle wheel comprising a hub portion, a rim portion, upwardly and downwardly projecting arms carried by and extending outwardly beyond the outer periphery of said hub portion, sectoral trackways having their centers in a plane passing longitudinally through the center of the wheel carried by said arms and formed on the outwardly lying portions thereof, coöperating arms carried by the axle of the vehicle and projecting outwardly a distance greater than said first arms, and bearing members carried by said second named arms for slidingly engaging said trackways.

4. A vehicle wheel comprising a hub portion, a rim portion, upwardly and downwardly projecting arms carried by said hub portion, sectoral trackways having their centers in a plane passing longitudinally through the center of the wheel carried by said arms, complemental sectoral bearing members for said trackways, outwardly projecting arms carried by the axle, and adjustable connecting means between said second named arms and said bearing members.

5. A vehicle wheel comprising a hub portion, a rim portion, upwardly and downwardly projecting arms carried by and extending outwardly beyond the outer periphery of said hub portion, sectoral trackways having their centers in a plane passing through the center of the wheel carried by said arms, complemental sectoral bearing members for said trackways, outwardly projecting arms carried by the axle and having rabbeted portions therein, flanged rear portions on said bearing members adapted to slidingly fit said rabbeted portions, bolts for locking said bearing members in adjusted position, in said rabbeted portions and supplemental bolts in said second named arms for controlling the position of said bearing members when under adjustment.

In testimony whereof I affix my signature in presence of two witnesses.

CASSIUS M. BARTHOLOMEW.

Witnesses:
WALTER E. L. BOCK,
A. L. PHELPS.